C. A. NOTMAN.

ATTACHMENT FOR STOVES.

APPLICATION FILED FEB. 26, 1908.

Reissued July 6, 1909.

12,984.

WITNESSES:

Brennan B. West.

Nathan F. Fretter

INVENTOR,

Clarence A. Notman

By Baldwin, Foulds & Hull

ATTY.

UNITED STATES PATENT OFFICE.

CLARENCE A. NOTMAN, OF ALLIANCE, OHIO.

ATTACHMENT FOR STOVES.

No. 12,984. Specification of Reissued Letters Patent. Reissued July 6, 1909.

Original No. 836,939, dated November 27, 1906, Serial No. 286,222. Application for reissue filed February 26, 1908. Serial No. 417,978.

*To all whom it may concern:*

Be it known that I, CLARENCE A. NOTMAN, a citizen of the United States, residing at Alliance, in the county of Stark and State of Ohio, have invented a certain new and useful Improvement in Attachments for Stoves, of which the following is a full, clear, and exact description, reference being had to the accompanying drawings.

This invention relates to stoves, and more particularly to stoves employing fluid or vapor fuel, and it has especial reference to the means applied to said stove for conserving the heat, and for distributing the same evenly, or substantially so, over a comparatively large area, whereby a large surface may be heated by a single burner and the heat may be applied to a number of utensils at the same time even though a single burner may be employed.

Further objects of the invention are to render the same simple and economical in construction and easy of application to the stove proper.

Figure 1:
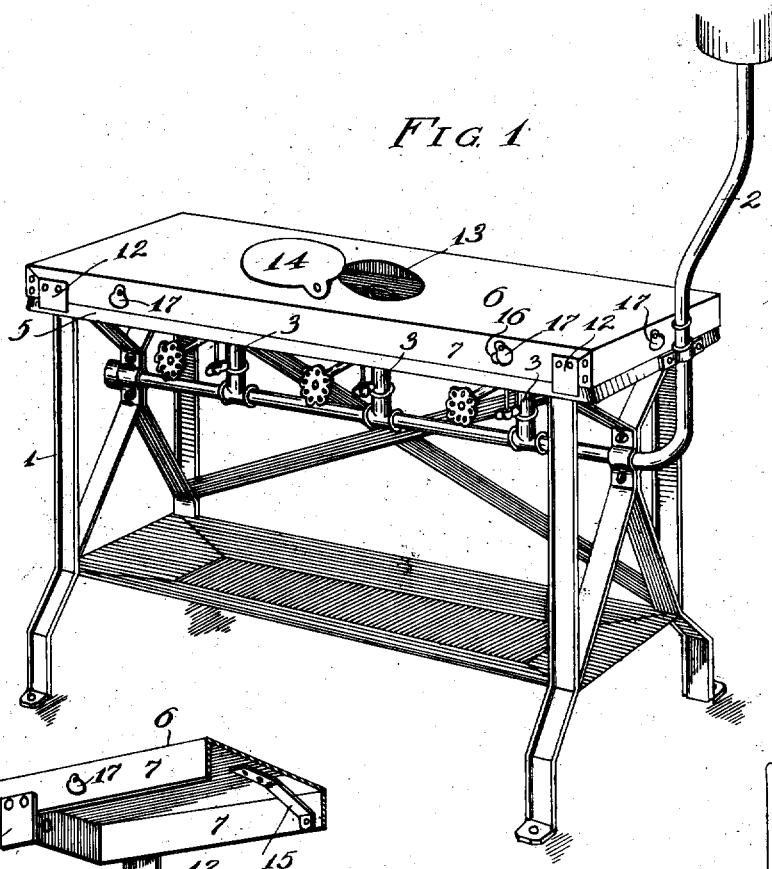
Figure 2:
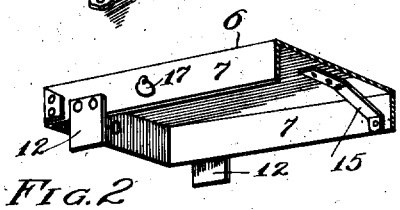
Figure 3:
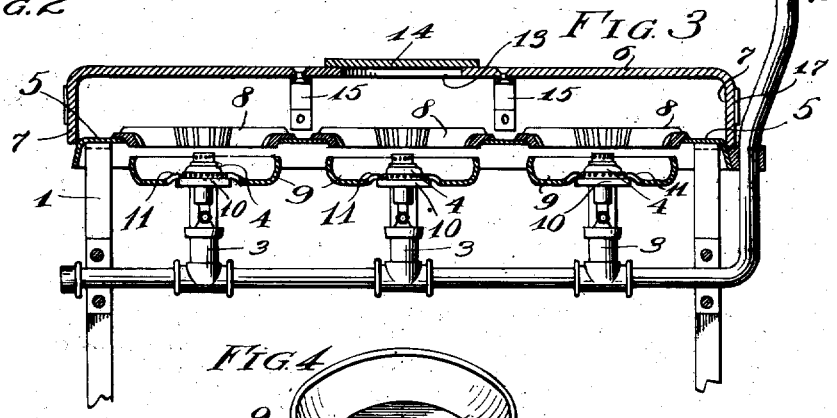
Figure 4:
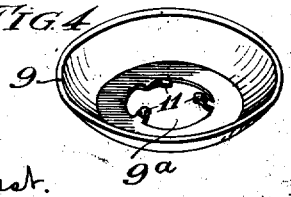

In the accompanying drawings forming a part hereof, Figure 1 is a perspective view showing my invention applied to a stove of the vapor burner type; Fig. 2 is a perspective view on a smaller scale showing a portion of the radiating plate; Fig. 3 is a vertical longitudinal section through the stove shown in Fig. 1 illustrating the different parts in their proper arrangement with respect to the stove; and Fig. 4 is a perspective view of the heat-retaining and flame-directing or deflecting plate detached from the other parts of the stove.

In the ordinary form of stove for burning fluid or vapor fuel, the burners are placed in the upper part of the stove and the flame is unconfined, so that substantially no heat can be obtained therefrom unless the vessel to be heated be placed directly over the flame. In order, therefore, to maintain a number of vessels in heated condition, it is necessary to use a separate burner for each vessel, which is, of course, quite wasteful of fuel. By my invention, I am enabled to conserve the heat and distribute the same over an extended surface so that many vessels may be kept heated even though a single burner be employed and that burner turned very low, thereby accomplishing the same result with a small quantity of fuel that has heretofore required a much greater quantity thereof.

Taking up a more specific description of my invention by reference to the accompanying drawings, in which the same reference character designates the same part throughout the several views, 1 represents a stove of any kind to which my invention may be applied. The stove itself, however, forms no particular part of the present invention, it being understood that the invention is applicable to stoves of almost any type and especially to those using fluid or vapor fuel. The stove shown in the drawing is provided with a fuel supply pipe 2 which leads to any source of fuel supply. To the supply pipe 2, I attach in the usual manner the burner pipes 3, which burner pipes convey the fuel to the burners 4, each of which is attached to its respective burner pipe. The burners herein shown are, so far as this invention is concerned, simply conventional, as I do not claim in the present invention any particular kind or style of burner. Above the stove plate or top 5 is located a metal plate or top proper 6, preferably made of sheet metal, which plate is spaced from the top face of the plate 5 by means of the side and end flanges 7 which, in the instance shown, are made integral with the top plate, by which arrangement a chamber is provided between the stove plate 5 and the cooking plate 6, which chamber is for the purpose of confining therein the air heated by the various burners 4.

For the purpose of directing the heat upwardly and through the open plates 8, I provide for each burner a flange disk 9, which disks are seated or placed upon the burner head 10, or are held in proper relation to the burners in any other suitable manner.

For the purpose of permitting the air to pass upwardly and above the disks 9 for feeding the flame with the necessary amount of oxygen, said disks are provided with apertures $9^a$, said apertures being of sufficient size to admit the necessary quantity of air for combustion, the disks being held by means of the tangs 11. The disks are preferably cup-shaped, as shown, and the concave faces of the disks upon their upper sides are so formed and located for better directing the flame upwardly, whereby the flame is properly guided and confined so that it passes from the burner into direct contact with the cooking plate or with the cooking utensil which may be placed in or over any aperture 13 in the cooking-plate.

For the purpose of holding the plate 6 in proper position, I attach to the flanges 7 thereon retaining plates 12, which retaining plates may be of any desired form, extending downwardly so that their bottom or lower ends will extend beyond the lower edges of the flanges 7 in position to engage the outer edges of the stove plate 5.

The top or cooking-plate 6 may be provided with any desired number of apertures 13, which apertures are for the purpose of receiving and holding cooking vessels of any desired kind when it is desired to have the flame of any given burner strike directly against the vessel. In the accompanying drawings I have shown but a single aperture.

For the purpose of closing the aperture 13, I provide a shutter-plate 14, which is pivotally attached to the top of the plate 6 in position to be swung over said aperture.

It will be understood that, by the construction above described, I am enabled to heat the top plate 6 evenly whereby a number of vessels may be heated at the same time, and may permit the flame from any burner to contact directly with the cooking vessels without materially decreasing the heat of the plate 6. It will also be understood that the top plate 6 and the side and end flanges 7 should be made of comparatively thin material; and, in order to prevent any sagging of the top plate, I may provide brace bars 15, which bars may be of the form shown, or of any other suitable form, the only object of said bars being to provide a sufficient support for the top plate so that it may carry the necessary weight without sagging.

While I have shown a stove having a rectangular top plate, I do not desire to be confined to any particular shape of such plate, as it will be understood that the objects of the invention may be carried into effect without regard to the form of the plate.

As will be understood, before a flame is lighted, the chamber below the cooking-plate is filled with cold air, which is a poor conductor of heat. That portion of the body of air in the chamber adjacent to the flame will become heated, whereas those portions farther distant therefrom will remain cold or will heat very slowly unless some means be provided for directing a current of heated air away from the burner toward that part of the cooking plate which it is desired to heat. For this purpose, I provide at suitable points, as in the flanges 7, a series of apertures 16, which may be closed either in whole or in part by dampers 71 which are mounted on said flanges and are preferably pivoted thereto, as shown. If, therefore, the flame be lighted at the right hand burner, in Fig. 3, and it be desired to heat the left-hand end of the cooking plate, the damper at or adjacent said end will be opened, and the aperture 13 closed, either by the shutter plate 14 or by a cooking utensil. The air entering through the apertures 9[a] in the disk 9 of course becomes heated by the flame and passes upwardly, displacing the air already in the chamber which passes outwardly through the open aperture 16, thereby creating a draft in the direction of said aperture and carrying the heat from the flame in a direction to heat the desired part of the plate 6.

Many changes in the specific details of my invention may be made without departing from the principles thereof, and I desire it to be understood that the following claims are not intended to be limited to such details any further than is rendered necessary by the specific terms employed, or by the prior state of the art.

Having thus described my invention, I claim:

1. The combination with a stove for burning liquid, vapor or gaseous fuel, said stove having a burner in its top, of a cooking-plate, depending flanges surrounding the edges of the cooking-plate and resting on the stove outside of the burner, said plate and its flanges forming an air chamber between the top of the stove and said plate, a deflecting plate surrounding the burner for directing the flame toward the air chamber, said deflecting plate having air apertures therein, and means for distributing the heated air from the burner to any desired portion of the cooking plate.

2. The combination with a stove for burning liquid, vapor, or gaseous fuel, said stove having a burner in its top, of a cooking plate, depending flanges surrounding the edges of the cooking plate and resting on the stove outside of the burner, said plate and its flanges forming an air chamber between the top of the stove and the said plate, the said depending flanges being provided with air passages, means connected with the flanges for holding the latter and the cooking-plate in proper position on the stove, dampers for regulating the effective sizes of said air passages, and a deflecting plate surrounding the burner for directing the flame and the heat therefrom into the air chamber, said deflecting plate being provided with air inlets adjacent the burner.

3. The combination with a stove for burning liquid, vapor, or gaseous fuel, said stove having a burner in its top, of a cooking plate, depending flanges surrounding the edges of the cooking plate outside of the burner, said plate and its flanges forming an air chamber between the top of the stove and said plate, the flanges being provided with air passages therein, independently operated dampers for regulating the effective sizes of said air passages, a deflecting plate surrounding the burner for directing the flame toward the air chamber, and means on said deflecting plate for supporting the latter from the burner, said deflecting plate having air apertures therein for furnishing air for combustion.

4. The combination of a stove provided with a burner, a detachable cooking-plate spaced from the top of the stove, said detachable plate provided with side and end flanges adapted for contact with the stove top, said cooking-plate provided with a vessel aperture, and the flanges provided with air-inlet apertures, braces secured to the cooking-plate for strengthening the latter, and shutter plates adapted to regulate the size of the air-inlet apertures, substantially as and for the purpose specified.

5. The combination of a stove provided with burners, a detachable cooking-plate spaced from the top of the stove, said detachable plate provided with integral side and end flanges adapted for contact with the stove top, said cooking-plate provided with a vessel aperture, and the flange provided with air-inlet apertures, braces secured to the cooking-plate upon its bottom or under side, and shutter plates adapted to regulate the size of the air-inlet apertures, substantially as and for the purpose specified.

6. In a stove, a burner, a cooking plate supported above the top of said stove, means for inclosing the space between the stove top and plate, and a deflector supported from the burner and independent of the stove-top and inclosing means for directing the flame into the space beneath the cooking plate.

7. In a stove, a burner, a cooking plate supported above the top of said stove, means for inclosing the space between the stove top and plate, and a cup-shaped deflector formed with inwardly projecting prongs, said prongs being adapted to engage the burner for the purpose of supporting the deflector, the spaces between the prongs providing inlets for air.

In testimony whereof, I hereunto affix my signature in the presence of two witnesses.

CLARENCE A. NOTMAN.

Witnesses:

R. P. Lambright,

A. S. Armstrong.